(12) United States Patent
Merlin

(10) Patent No.: US 9,246,550 B2
(45) Date of Patent: *Jan. 26, 2016

(54) NFC DEVICE FOR CONTACTLESS COMMUNICATION

(71) Applicant: NXP B.V., Eindhoven (NL)

(72) Inventor: Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,293

(22) Filed: Jun. 11, 2014

(65) Prior Publication Data

US 2014/0295756 A1 Oct. 2, 2014

Related U.S. Application Data

(63) Continuation of application No. 14/028,417, filed on Sep. 16, 2013, now Pat. No. 8,818,297, which is a continuation of application No. 12/743,390, filed as application No. PCT/IB2008/054761 on Nov. 13, 2008, now Pat. No. 8,559,890.

(30) Foreign Application Priority Data

Nov. 19, 2007 (EP) .................................. 07120965

(51) Int. Cl.
*H04B 5/00* (2006.01)
*G06K 19/077* (2006.01)

(52) U.S. Cl.
CPC ........ *H04B 5/0025* (2013.01); *G06K 19/07749* (2013.01); *H04B 5/0031* (2013.01); *H04B 5/0037* (2013.01); *H04B 5/0056* (2013.01); *H04B 5/0062* (2013.01); *H04B 5/0075* (2013.01)

(58) Field of Classification Search
CPC .. H04B 5/0031; H04B 5/0037; H04B 5/0056; H04B 5/0025; H04B 5/0062; H04B 5/0075; G06K 19/07749
USPC .......................... 455/41.1, 91, 127.1, 129, 73
See application file for complete search history.

(56) References Cited

U.S. PATENT DOCUMENTS

| | | | |
|---|---|---|---|
| 4,719,374 A | 1/1988 | Bialo | |
| 6,952,167 B2 | 10/2005 | Wakabayashi | |
| 8,116,677 B2 | 2/2012 | Rofougaran et al. | |
| 2006/0049918 A1 | 3/2006 | Takiguchi | |
| 2006/0186995 A1 | 8/2006 | Wu et al. | |
| 2006/0238301 A1 | 10/2006 | Wu et al. | |
| 2007/0046369 A1 | 3/2007 | Schober et al. | |
| 2009/0027116 A1 | 1/2009 | Bach | |
| 2011/0241637 A1 | 10/2011 | Parker | |

FOREIGN PATENT DOCUMENTS

| | | |
|---|---|---|
| WO | 2007014053 A2 | 2/2007 |
| WO | 2007105605 A1 | 9/2007 |

OTHER PUBLICATIONS

International Search Report, PCT/IB2008/054761, Jul. 20, 2009.

*Primary Examiner* — Lewis West

(57) ABSTRACT

A Near Field Communication (NFC) device for contactless communication includes a transmitter being adapted to generate an electromagnetic carrier signal and to modulate the carrier signal according to transmitting data, an antenna having an inductor, which antenna is connected to and driven by the transmitter with the modulated carrier signal, and wherein connection points of the antenna are further connected to inputs of switches, the outputs of these switches being switchable between ground potential and inputs of a rectifier, the outputs of the rectifier being fed to power supply rails of the NFC device.

20 Claims, 3 Drawing Sheets

NFC DEVICE FOR CONTACTLESS COMMUNICATION

This application is a Continuation of U.S. application Ser. No. 14/028,417, filed on Sep. 16, 2013, which is a Continuation of U.S. application Ser. No. 12/743,390, filed on May 18, 2010, entitled "Transceiving circuit for contactless communication," now U.S. Pat. No. 8,559,890, which claims priority to EP Application No. EP 07120965.4, filed on Nov. 19, 2007 and PCT Application IB2008/054761 filed Nov. 13, 2008.

FIELD OF THE INVENTION

The invention relates to a transceiving circuit for contactless communication comprising transmitter means being adapted to generate an electromagnetic carrier signal and to modulate the carrier signal according to transmitting data, and an antenna having an inductor, which antenna is connected to and driven by the transmitter means with the modulated carrier signal.

The invention further relates to an NFC device.

BACKGROUND OF THE INVENTION

FIG. 1 shows a prior art implementation of a transceiving circuit for contactless communication. This transceiving circuit employs an integrated near field communication transmission module 2, type no. PN5xx, e.g. type no. PN511 or PN512 prior art matching is also valid for the Micore family (MF RC5xx, MF RC632, SL RC400), manufactured by NXP Semiconductors and external passive electronic components. The transmission module 2 is integrally equipped with transmitter means 3 being adapted to generate an electromagnetic carrier signal, to modulate the carrier signal according to transmitting data and to drive an antenna 5 with the modulated carrier signal, and with receiver means 4 being adapted to sense response signals being received at the antenna 5 and to demodulate the response signals. The transmission module 2 has output terminals TX1, TX2 being connectable to first and second transmitting paths wherein the transmitting paths are connected to the antenna 5, being represented in FIG. 1 by its equivalent circuit components capacitance Cant and inductance Lant. Between the output terminals TX1, TX2 of the transmission module 2 and the external antenna 5 the following devices are switched into the transmitting paths: an electromagnetic compatibility (EMC) filter comprising two inductors L0 and two capacitors C0; and an impedance matching network comprising ohmic resistors RQ and capacitors (not shown). It should be noted that during manufacturing of the transceiving circuits the antenna 5 is "tuned" by means of the impedance matching network.

Further, the receiver means 4 of the transmission module 2 comprise an input terminal RX that is connected to a receiving path that branches off from the first transmitting path. A phase adjusting capacitor C13 is switched into the receiving path in order to enable adjusting of the phase angle of signals between the first transmitting path and the receiving path. By adjusting the phase angle an optimal demodulation can be achieved. Further, an ohmic resistor R1 is serially switched into the receiving path. With this resistor R1 the voltage level appearing at the input terminal RX of the receiver means 4 can be adjusted. Numeral VMID depicts an analog reference voltage input of the receiver means 4. A capacitor C14 is switched between the analog reference voltage input VMID and ground potential. An ohmic resistor R2 connects the input terminal RX and the analog reference voltage input VMID.

For a better understanding of the function of the RFID transmission module 2, a block diagram of the near field communication (NFC) transmission module type no. PN511 is shown in FIG. 2. The NFC transmission module 2 comprises analog circuitry which can be roughly divided into transmitter means 3 and receiver means 4. Although not shown, the analog circuitry comprises output drivers, an integrated demodulator, a bit decoder, a mode detector and an RF-level detector. A contactless UART communicates with the analog circuitry via a bus. The contactless UART comprises data processing means, CRC/Parity generation and checking means, frame generation and checking means, and bit coding and decoding means. The UART further communicates with a microprocessor, comprising a 80C51 core, ROM and RAM. A host interface enables to connect the transmission module to external devices. The host interface may comprise I2C, serial UART, SPI and/or USB interfaces. Further details of the transmission module can be looked up in the respective data sheets which are publicly available.

One of the most important field of application of near field communication (NFC) transmission modules are mobile phones. Mobile phones equipped with NFC transmission modules can be used for ticketing, access control systems, payment services, etc. Usually, the NFC transmission modules are powered by the hosting mobile phone. Nevertheless, specifically for ticketing applications, there is a strong demand that the NFC transmission module must still be operable when the battery of the mobile phone has been exhausted in order to keep the tickets managed by the NFC transmission modules available. This demand has resulted in considerations of using electric energy that is provided by an electromagnetic field generated by an external reading device. This so called "powered by the field mode" has already been implemented in standard NFC cards and standard cards where a powered by the field circuitry is directly connected with the antenna. This approach, however, has the inherent disadvantage that such a card cannot be operated in a so called "reader mode" where the NFC card plays the role of a reading device that initiates communication with target NFC devices. Operating an NFC device in the reader mode requires an external voltage supply since the NFC device itself has to generate an electromagnetic field. In order to enable the reader mode for such a card the powered by the field circuitry has to be physically removed because it interferes with the reader mode circuitry. This removing in turn renders the powered by the field mode impossible. Therefore, there is still a strong need for a transceiving circuit for contactless communication that allows the circuit to be operated in a reader mode, a powered by the field card mode, and a battery supplied card mode without requiring to physically add or remove any hardware parts.

OBJECT AND SUMMARY OF THE INVENTION

It is an object of the invention to provide a transceiving circuit for contactless communication of the type defined in the opening paragraph and an NFC device in which the disadvantages defined above are avoided. Particularly, the transceiving circuit for contactless communication according to the present invention has to be operable in a reader mode, a powered by the field card mode, and a battery supplied card mode without requiring to physically add or remove any hardware parts.

In an embodiment, a Near Field Communication (NFC) device for contactless communication includes a transmitter being adapted to generate an electromagnetic carrier signal and to modulate the carrier signal according to transmitting data, an antenna having an inductor, which antenna is connected to and driven by the transmitter with the modulated carrier signal, and wherein connection points of the antenna are further connected to inputs of switches, the outputs of these switches being switchable between ground potential and inputs of a rectifier, the outputs of the rectifier being fed to power supply rails of the NFC device.

In another embodiment, an NFC device for contactless communication includes a transmitter being adapted to generate an electromagnetic carrier signal and to modulate the carrier signal according to transmitting data, an antenna having an inductor, which antenna is connected to and driven by the transmitter with the modulated carrier signal, and a rectifier having outputs connected to power supply rails of the NFC device. The connection points of the antenna are further connected to inputs of switches, the outputs of these switches being switchable between ground potential and inputs of the rectifier and when the switches are connected to ground potential, the NFC device is in a battery supplied card mode or a reader mode and when the switches are connected to the rectifier, the NFC device is in a powered by the field mode.

In an embodiment, in order to achieve the object defined above, with a transceiving circuit according to the invention characteristic features are provided so that a transceiving circuit according to the invention can be characterized in the way defined below, that is:

A transceiving circuit for contactless communication comprising:

transmitter means being adapted to generate an electromagnetic carrier signal and to modulate the carrier signal according to transmitting data, an antenna having an inductor, which antenna is connected to and driven by the transmitter means with the modulated carrier signal, wherein AC coupling capacitors are coupled to the inductor of the antenna, wherein the AC coupling capacitors are further connected to inputs of switches the outputs of these switches being switchable between ground potential and inputs of rectifier means, the outputs of the rectifying means being fed to power supply rails of the transceiving circuit.

The characteristic features according to the invention provide the advantage that the circuit can be operated in all NFC modes, i.e. a reader mode, a powered by the field card mode and a battery supplied card mode without the necessity to physically add or remove any hardware parts. Particularly, the transceiving circuit according to the present invention can safely be operated within the limits of the NFC standards.

Switching among the various NFC modes can be done automatically by providing mode selection means that control the switches such that the outputs of the switches are switched to ground in a reader mode and optionally in a card mode, and are switched to the inputs of the rectifier means in a powered by the field mode.

By arranging a capacitor in series between partial inductors of the inductor of the antenna and coupling each of the AC coupling capacitors with one of its terminals to a respective connection point of the serial capacitor and one of the partial inductors, the antenna can be tuned so that all three NFC modes can be operated within the required electrical boundaries.

In order to achieve symmetric operation of the transceiver circuit it is preferred to divide the inductors of the antenna into two partial inductors having about the same inductance values.

In another embodiment of the transceiver circuit according to the invention the AC coupling capacitors are inductively coupled to the inductor of the antenna by means of a coupling inductor, which together with the inductor of the antenna constitutes a transformer. This embodiment of the invention avoids direct coupling of the AC coupling capacitors to the antenna.

In order to transform the AC electromagnetic signals received by the antenna to appropriate values it is preferred to choose the inductance of the inductor of the antenna to be smaller than the inductance of the coupling inductor.

Further, in order to smooth the received AC electromagnetic signals, it is preferred to connect a smoothing capacitor in parallel to the coupling inductor.

In yet another embodiment of the invention, the transceiver circuit the AC coupling capacitors are galvanic-coupled to the inductor of the antenna, preferably via ohmic resistors. This embodiment enables exact antenna tuning. In order to enhance the antenna tuning, it is preferred to couple resonance frequency setting capacitors with first terminals to the AC coupling capacitors and with second terminals to ground.

In order to minimize variation of the resonance frequency of the antenna it is preferred that the capacitances of the resonance frequency setting capacitors are higher than the capacitances of the AC coupling capacitors, preferably at least by a factor of four.

The transceiving circuit according to the invention can be incorporated in an NFC device.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 1:
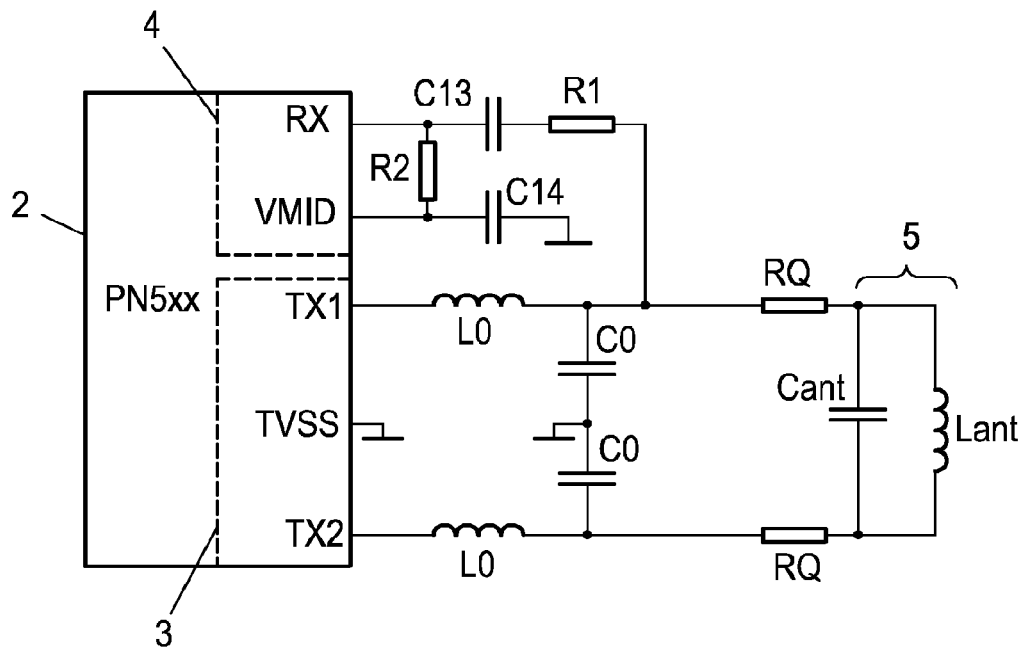
FIG. 1 shows a circuit diagram of a transceiving circuit for contactless communication according to prior art.
Figure 2:
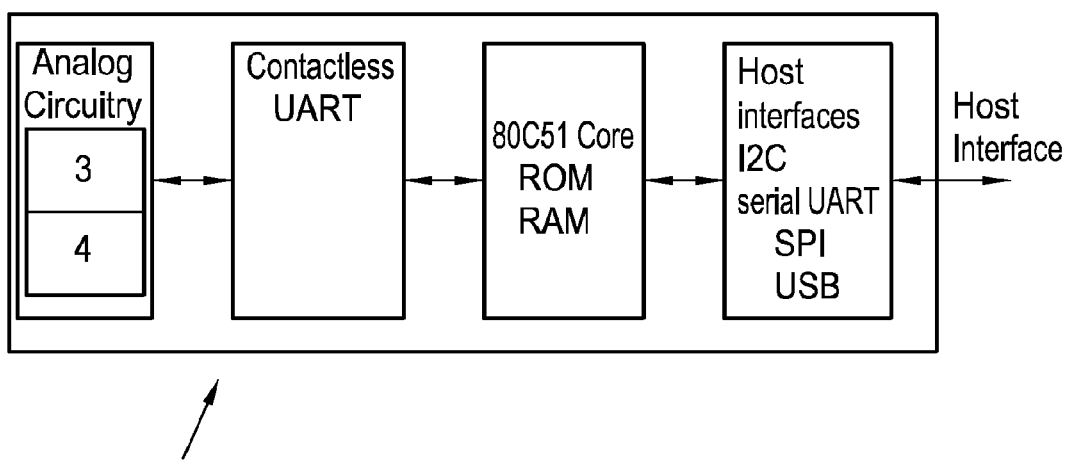
FIG. 2 shows a block diagram of a transmission module incorporated in the transceiving circuit of FIG. 1.
Figure 3:
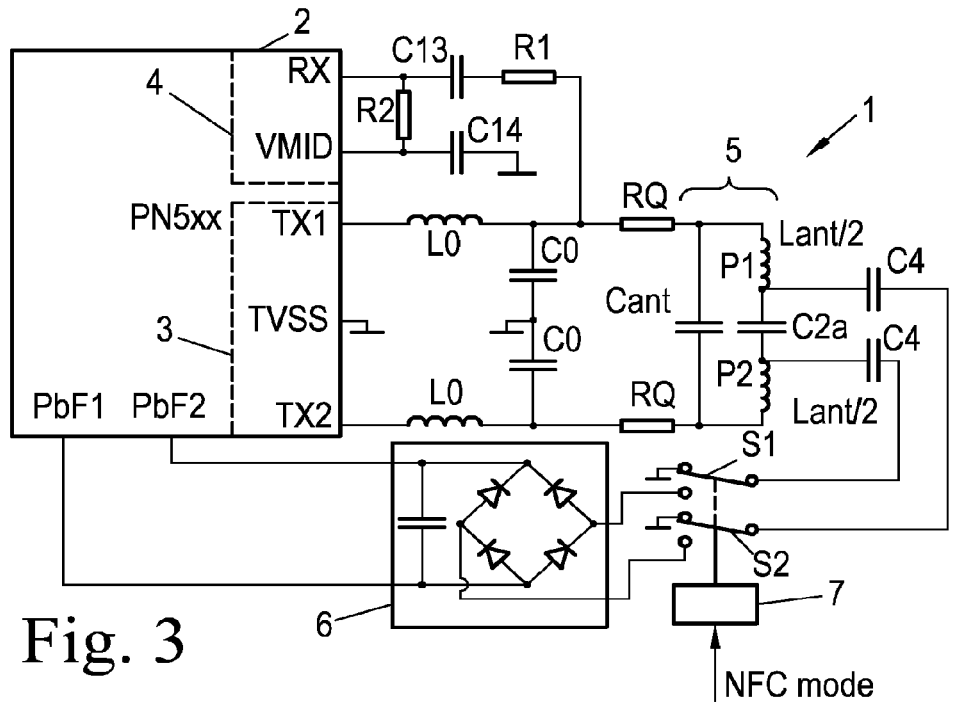
FIG. 3 shows a circuit diagram of a transceiving circuit for contactless communication according to a first embodiment of the present invention.

FIG. 3 shows a circuit diagram of a transceiving circuit 1 according to a first embodiment of the present invention. This transceiving circuit comprises an integrated RFID transmission module 2, e.g. a near field communication transmission module of the type no. PN5xx manufactured by NXP Semiconductors. The transmission module 2 comprises transmitter means 3 and receiver means 4. The transmitter means 3 of the RFID transmission module 2 generate an electromagnetic carrier signal. The carrier signal is modulated according to transmitting data. An antenna 5 is driven with the modulated carrier signal. The transmission module 2 has output terminals TX1, TX2 being connected to first and second transmitting paths wherein the transmitting paths are connected to the antenna 5, which is represented in FIG. 3 by its equivalent circuit components, i.e. a capacitor Cant and an inductor Lant. Between the output terminals TX1, TX2 of the transmission module 2 and the external antenna 5 the following devices are switched into the transmitting paths: an electromagnetic compatibility (EMC) filter comprising two inductors L0 and two capacitors C0; and an impedance matching network comprising ohmic resistors RQ and capacitors (not shown). It should be noted that during manufacturing of the transceiving circuits the antenna 5 is "tuned" by means of the impedance matching network.

Further, the receiver means 4 of the transmission module 2 comprise an input terminal RX that is connected to a receiving path that branches off from the first transmitting path. A phase adjusting capacitor C13 is switched into the receiving path in order to enable adjusting of the phase angle of signals between the first transmission path and the receiving path. By adjusting the phase angle, an optimal demodulation can be achieved. Further, an ohmic resistor R1 is serially switched into the receiving path. With this resistor R1 the voltage level appearing at the input terminal RX of the receiver means 4 can be adjusted. Numeral VMID depicts an analog reference voltage input of the receiver means 4. A capacitor C14 is switched between the analog reference voltage input VMID and ground potential. An ohmic resistor R2 connects the input terminal RX and the analog reference voltage input VMID. The receiver means 4 are not part of the present invention, but are known to those skilled in the art, so they do not have to be explained in greater detail.

The hitherto explained components of the transceiving circuit 1 are prior art. According to the present invention, two AC coupling capacitors C4, C4 are provided which are coupled with their first terminals to the inductor Lant of the antenna 5. In more detail, the inductor Lant of the antenna 5 is divided into two partial inductors Lant/2 having about the same inductance values and a serial capacitor C2a is arranged in series between said partial inductors Lant/2 of the inductor Lant of the antenna 5. The first terminals of the AC coupling capacitors C4 are coupled to respective connection points P1, P2 of the serial capacitor C2a and a respective one of the partial inductors Lant/2. The serial capacitor C2a enables fine grained antenna tuning and contributes in coupling electric energy to the AC coupling capacitors C4 within a requested range, which electric energy is received by the antenna 5 from an electromagnetic field that is generated by an NFC reading device (not shown). The second terminals of the AC coupling capacitors C4 are connected to inputs of switches S1, S2. The outputs of these switches S1, S2 can be switched between ground potential and inputs of rectifying means 6. The outputs of the rectifying means 6 are fed to power supply rails PbF1, PbF2 of the transceiving circuit 1 and/or its transmission module 2, respectively.

The switches S1, S2 are controlled by mode selection means 7 which are adapted to switch the outputs of the switches S1, S2 to ground in a reader mode and optionally in a card mode, so that the second terminals of the AC coupling capacitors C4 are drawn to ground potential, and to switch the outputs of the switches S1, S2 to the inputs of the rectifier means 6 in a powered by the field mode, such that AC electric energy is fed via the AC coupling capacitors C4 to the inputs of the rectifier means 6 where it is converted into DC electric energy to be used for supplying the transceiving circuit 1. Due to the relatively high voltages being present across the serial capacitor C2a, there is enough energy available for supplying the transceiving circuit 1 and/or its transmission module 2 with electric energy. Further, serial capacitor C2a and AC coupling capacitor C4 contribute in tuning the antenna.

It should be noticed that the switches S1, S2, the mode selection means 7 and/or the rectifying means 6 can either be configured as discrete components or can be integrated in the transmission module 2. It should further be noticed that prior art transmission modules like type no. PN5xx, e.g. type no. PN511 or PN512, manufactured by NXP Semiconductors can easily be enhanced with additional power supply input terminals to which the outputs of the rectifying means 6 are connected.

It should further be noticed that, when the switches S1, S2 are switched to ground potential the two AC coupling capacitors C4, C4 are electrically arranged in series and are together arranged in parallel to the serial capacitor C2a. Hence, this position of the switches contributes to matching the antenna 5.

A feature of the present invention is that by switching the switches S1, S2 according to a requested NFC operating modes all modes, i.e. a reader mode, a powered by the field card mode, and a battery supplied card mode can be set and operated without having to physically replace or remove components of the transceiving circuit 1.

The embodiment of the transceiving circuit 1 is, however, not the only way to implement the present invention. In order to enlighten possible variations of the inventions two further embodiments of transceiving circuits according to the present invention will now be explained. The present invention is, however, not limited to these exemplary embodiments.

Figure 4:
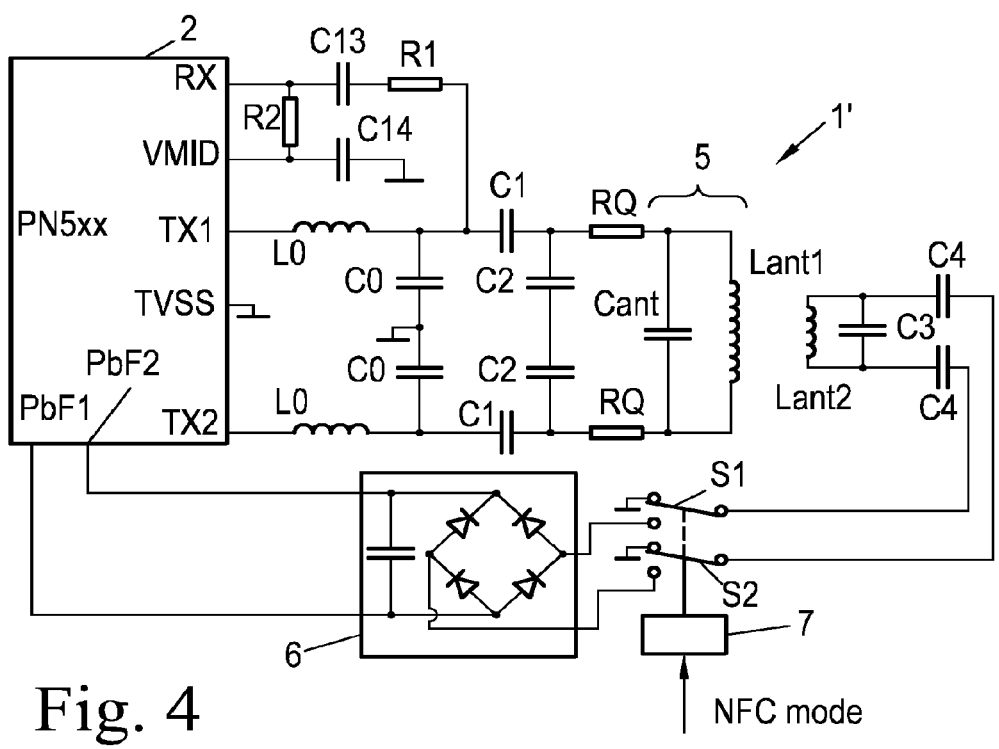
FIG. 4 shows a circuit diagram of a transceiving circuit for contactless communication according to a second embodiment of the present invention.

FIG. 4 shows a circuit diagram of a second embodiment of a transceiving circuit 1' for contactless communication. This second embodiment differs from the first embodiment only in that the coupling mode of the AC coupling capacitors C4 have been changed from direct coupling to inductive coupling. In detail, there is provided a coupling inductor Lant2 which together with the inductor Lant1 of the antenna 5 constitutes a transformer for transforming AC electric energy received by the antenna 5. The first terminals of the two AC coupling capacitors C4, C4 are connected with opposed terminals of the coupling inductor Lant2. The second terminals of the two AC coupling capacitors C4, C4 are like in the first embodiment connected with the inputs of switches S1, S2. In order to transform the AC electric energy to appropriate voltage levels it is preferred that the inductance of the inductor Lant1 of the antenna 5 is chosen to have a higher value than the inductance of the coupling inductor Lant2. Further, a smoothing capacitor C3 is connected in parallel to the coupling inductor Lant2. The smoothing capacitor C3 contributes in setting a resonance frequency of the circuit. Capacitors C1, C1, C2, C2 together with ohmic resistors RQ, RQ constitute an impedance matching and resonance frequency setting network which is primarily necessary when the transceiver circuit 1' is operated in a reader mode.

Figure 5:
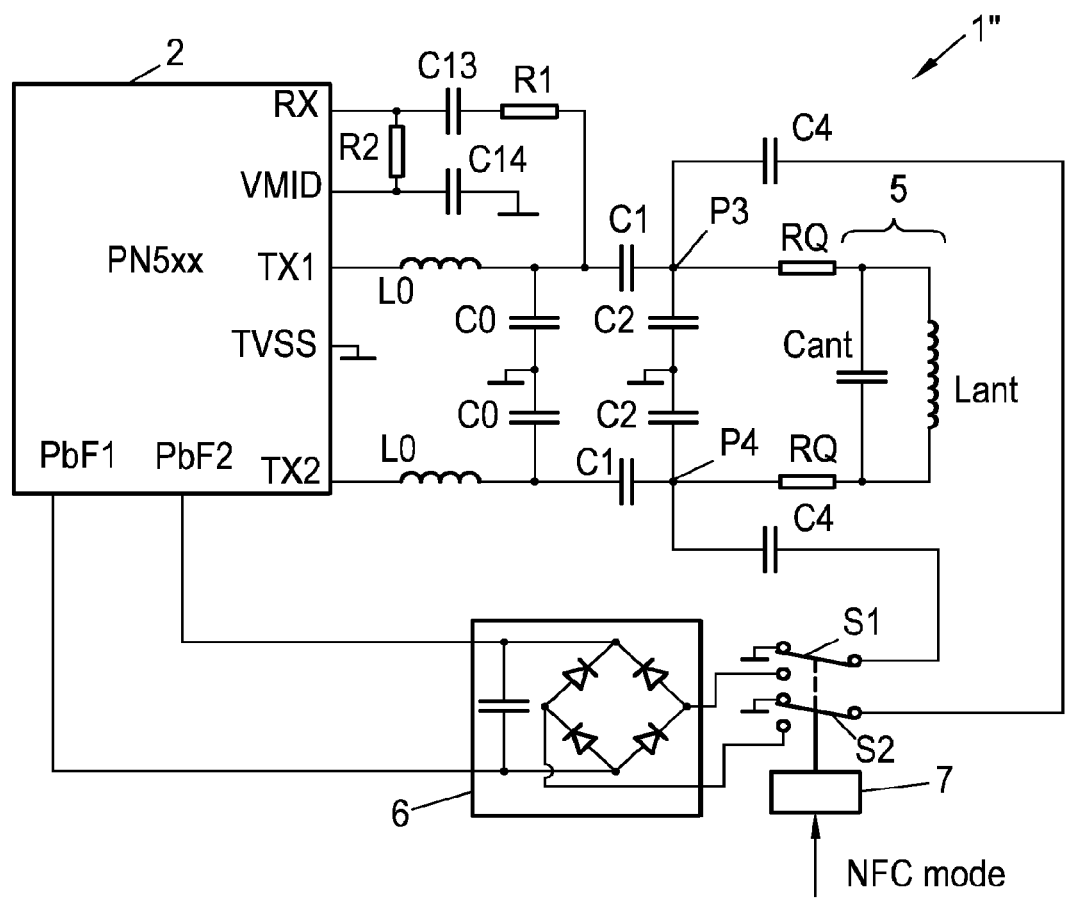
FIG. 5 shows a circuit diagram of a transceiving circuit for contactless communication according to a third embodiment of the present invention.

FIG. 5 shows a circuit diagram of a third embodiment of a transceiving circuit 1" for contactless communication having yet another coupling circuit for coupling the AC coupling capacitors C4, C4 to the antenna 5. In this embodiment the first terminals of the coupling capacitors C4, C4 branch off from connection points P3, P4 which connect capacitors C1, C2 and an ohmic resistor (RQ) of an impedance matching and resonance frequency setting network, as can be seen from the circuit diagram of FIG. 5. The capacitances of the resonance frequency setting capacitors C2, C2 are chosen to be higher than the capacitances of the AC coupling capacitors C4. Preferably, they differ by a factor of four or higher. The second terminals of the two AC coupling capacitors C4, C4 are like in the first embodiment connected with the inputs of switches S1, S2.

The transceiver circuit 1, 1', 1" according to the present invention is perfectly adapted to be used in NFC devices and is particularly useful for use in NFC mobile telephones.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A Near Field Communication (NFC) device for contactless communication comprising:
   a transmitter being adapted to generate an electromagnetic carrier signal and to modulate the carrier signal according to transmitting data; and
   an antenna having an inductor, which antenna is connected to and driven by the transmitter with the modulated carrier signal,
   wherein connection points of the antenna are further connected to inputs of switches, the outputs of the switches being switchable between ground potential and inputs of a rectifier, the outputs of the rectifier being fed to power supply rails of the NFC device.

2. The NFC device of claim 1, wherein the switches are controlled by a mode selector adapted to switch the outputs of the switches to ground in a card mode, and to switch the outputs of the switches to the inputs of the rectifier in a powered by the field mode.

3. The NFC device of claim 1, wherein the inductor of the antenna is divided into two partial inductors having about the same inductance values.

4. The NFC device of claim 1, wherein the NFC device is adapted to be powered by a mobile phone.

5. The NFC device of claim 1, wherein the switches are controlled by a mode selector adapted to switch the outputs of the switches to ground in a reader mode, and to switch the outputs of the switches to the inputs of the rectifier in a powered by the field mode.

6. The NFC device of claim 1, wherein when the switches are connected to ground potential, the NFC device is in reader mode.

7. The NFC device of claim 1, wherein when the switches are connected to ground potential, the NFC device is in battery supplied card mode.

8. The NFC device of claim 1, wherein when the switches are connected to the rectifier, the NFC device is in a powered by the field mode.

9. The NFC device of claim 1, wherein when the switches are connected to the rectifier, the NFC device is in a powered by field card mode.

10. A Near Field Communication (NFC) device for contactless communication comprising:
    a transmitter being adapted to generate an electromagnetic carrier signal and to modulate the carrier signal according to transmitting data; and
    an antenna having an inductor, which antenna is connected to and driven by the transmitter with the modulated carrier signal,
    wherein connection points of the antenna are further connected to inputs of switches, the outputs of the switches being switchable between either connected to or not connected to inputs of a rectifier, the outputs of the rectifier being fed to power supply rails.

11. The NFC device of claim 10, wherein the switches are controlled by a mode selector adapted to switch the outputs of the switches to being not connected to the inputs of the rectifier in a powered by a battery mode, and to switch the outputs of the switches to being connected to the inputs of the rectifier in a powered by the field mode.

12. The NFC device of claim 11, wherein the NFC device is adapted to be powered by a mobile phone.

13. The NFC device of claim 11, wherein the outputs of the rectifier are being fed to power supply rails of the NFC device.

14. The NFC device of claim 11, wherein when the outputs of the switches are not connected to the inputs of the rectifier, the NFC device is in a battery supplied card mode or a reader mode.

15. The NFC device of claim 11, wherein when the outputs of the switches are connected to the inputs of the rectifier, the NFC device is in a powered by the field mode.

16. A Near Field Communication (NFC) device for contactless communication comprising:
    a transmitter being adapted to generate an electromagnetic carrier signal and to modulate the carrier signal according to transmitting data; and
    an antenna having an inductor, which antenna is connected to and driven by the transmitter with the modulated carrier signal,
    wherein connection points of the antenna are further connected to inputs of switches, the outputs of the switches being switchable between either connected to or not connected to inputs of a circuit device, the outputs of the circuit device being fed to power supply rails.

17. The NFC device of claim 16, wherein the switches are controlled by a mode selector adapted to switch the outputs of the switches to being not connected to the inputs of the circuit device in a powered by a battery mode, and to switch the outputs of the switches to being connected to the inputs of the circuit device in a powered by the field mode.

18. The NFC device of claim 17, wherein the NFC device is adapted to be powered by a mobile phone.

19. The NFC device of claim 17, wherein the circuit device is one of the following: a rectifier, a transformer.

20. The NFC device of claim 17, wherein the outputs of the rectifier are being fed to power supply rails of the NFC device.

* * * * *